(12) United States Patent
Buddhikot et al.

(10) Patent No.: US 8,958,810 B2
(45) Date of Patent: Feb. 17, 2015

(54) METHOD AND APPARATUS FOR SPECTRUM ALLOCATION IN WIRELESS NETWORKS

(75) Inventors: Milind M. Buddhikot, Manalapan, NJ (US); Scott C. Miller, Freehold, NJ (US); Kevin Ryan, Aberdeen, NJ (US)

(73) Assignees: Alcatel Lucent, Boulogne-Billancourt (FR); Stevens Institute of Technology, Hoboken, NJ (US)

( * ) Notice: Subject to any disclaimer, the term of this patent is extended or adjusted under 35 U.S.C. 154(b) by 684 days.

(21) Appl. No.: 11/557,176

(22) Filed: Nov. 7, 2006

(65) Prior Publication Data

US 2008/0108365 A1 May 8, 2008

(51) Int. Cl.
*H04W 72/00* (2009.01)
*H04W 16/10* (2009.01)
*H04W 16/14* (2009.01)

(52) U.S. Cl.
CPC .............. *H04W 16/10* (2013.01); *H04W 16/14* (2013.01)
USPC ......... 455/452.2; 455/450; 455/453; 455/509

(58) Field of Classification Search
USPC ............................ 455/446–453, 509–515, 525
See application file for complete search history.

(56) References Cited

U.S. PATENT DOCUMENTS

| | | | | |
|---|---|---|---|---|
| 5,584,046 | A * | 12/1996 | Martinez et al. | 455/13.1 |
| 5,594,949 | A * | 1/1997 | Andersson et al. | 455/437 |
| 7,043,225 | B1 * | 5/2006 | Patel et al. | 455/405 |
| 7,126,913 | B1 * | 10/2006 | Patel et al. | 370/230.1 |
| 7,436,788 | B2 * | 10/2008 | Huschke et al. | 370/310 |
| 7,570,593 | B1 * | 8/2009 | ElBatt et al. | 370/238 |
| 7,890,115 | B2 * | 2/2011 | Feng et al. | 455/450 |
| 7,912,081 | B2 * | 3/2011 | Heidari-Bateni et al. | 370/443 |
| 7,924,867 | B2 * | 4/2011 | Haas et al. | 370/445 |
| 8,040,857 | B2 * | 10/2011 | Wang et al. | 370/337 |
| 8,073,458 | B2 * | 12/2011 | Chang | 455/453 |
| 8,169,961 | B2 * | 5/2012 | Bieth et al. | 370/329 |
| 8,509,099 | B2 * | 8/2013 | Sengupta et al. | 370/252 |
| 2004/0156312 | A1 * | 8/2004 | Salonidis et al. | 370/229 |
| 2005/0128971 | A1 * | 6/2005 | Huschke et al. | 370/328 |
| 2006/0098677 | A1 * | 5/2006 | Ozer | 370/437 |
| 2007/0147287 | A1 * | 6/2007 | Jalil et al. | 370/329 |

OTHER PUBLICATIONS

M. Buddhikot et al., "DIMSUMnet: New Directions in Wireless Networking Using Coordinated Dynamic Spectrum Access," Position Paper in IEEE Int. Symp. on a World of Wireless, Mobile and Multimedia Networks (IEEE WoWMoM 2005), Taromina/Giardini Naxos, Italy, Jun. 2005.

M Buddhikot and K. Ryan, "Spectrum Management in Coordinated Dynamic Spectrum Access Based Cellular Networks," Proceedings of the First IEEE Int. Symp. on New Directions in Dynamic Spectrum Access Networks, Baltimore, MD, Nov. 8-11, 2005.

* cited by examiner

*Primary Examiner* — Sharad Rampuria
(74) *Attorney, Agent, or Firm* — Wall & Tong, LLP

(57) ABSTRACT

The invention includes a method and apparatus for dynamically allocating spectrum available within a region including a plurality of base stations. The method includes obtaining a plurality of spectrum demands associated with at least a portion of the base stations, each spectrum demand requesting a portion of the available spectrum, and determining a plurality of spectrum allocations satisfying at least a portion of the spectrum demands. The spectrum allocations are determined by processing the spectrum demands using network information such as base station information associated with the base stations and region information such as terrain information associated with the region. The region information may include signal propagation information.

20 Claims, 8 Drawing Sheets

METHOD AND APPARATUS FOR SPECTRUM ALLOCATION IN WIRELESS NETWORKS

GOVERNMENT RIGHTS IN THIS INVENTION

This invention was made with U.S. Government support under sub-award No. 527053-01 of primary-award contract number CNS-0435348, awarded by the National Science Foundation. The U.S. government may have certain rights in this invention.

FIELD OF THE INVENTION

The invention relates to the field of communication networks and, more specifically, to dynamic spectrum allocation in wireless networks.

BACKGROUND OF THE INVENTION

The radio spectrum resources in most countries around the world are statically partitioned into blocks allocated for different purposes. The characteristics of spectrum usage, such as type of service (e.g., cellular, public safety, television broadcast), maximum transmit power, and the like are a-priori specified, and are time and location invariant. Disadvantageously, such current spectrum allocation rules were based on antiquated technology assumptions, as well as in the absence of adequate market mechanisms. Furthermore, existing spectrum management processes, involving primary user licensing or property rights on one extreme and complete unlicensed usage, or commons, on the opposite extreme, have numerous serious drawbacks resulting in disadvantageous associated business and operational implications.

The business implications of such existing spectrum management processes has led to purpose-built networks involving capital-intensive steps of acquiring licensed spectrum, deploying network infrastructure, and offering and operating end-user services over the network infrastructure using the licensed spectrum. Furthermore, the process of acquiring licensed spectrum tends to be a slow, expensive process, especially due to the "big player syndrome" in which only very large service providers can compete. Disadvantageously, such business implications result in slow innovation of both networks and services (e.g., as evident in the inordinate delays in the introduction of Third Generation (3G) wireless networks).

The operational implications of such existing spectrum management processes include: (1) although a majority of spectrum is licensed for use, a large portion of the licensed spectrum is highly underutilized (e.g., public safety spectrum, military and government spectrum, and certain ultra high frequency (UHF) television spectrum) and (2) several licensed spectrum bands (e.g., cellular and personal communications services (PCS) bands) are utilized, however, utilization varies dramatically over space and time. By contrast, unlicensed spectrum bands have experienced unfettered network deployment due to low cost technology. In other words, spectrum is access limited rather than throughput limited.

SUMMARY OF THE INVENTION

Various deficiencies in the prior art are addressed through the invention of a method and apparatus for dynamically allocating available spectrum within a region comprising a plurality of base stations. The method includes obtaining a plurality of spectrum demands associated with at least a portion of the base stations, each spectrum demand requesting a portion of the available spectrum, and determining a plurality of spectrum allocations satisfying at least a portion of the spectrum demands. The spectrum allocations are determined by processing the spectrum demands using network information such as base station information associated with the base stations and region information such as terrain information associated with the region. The region information may include signal propagation information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
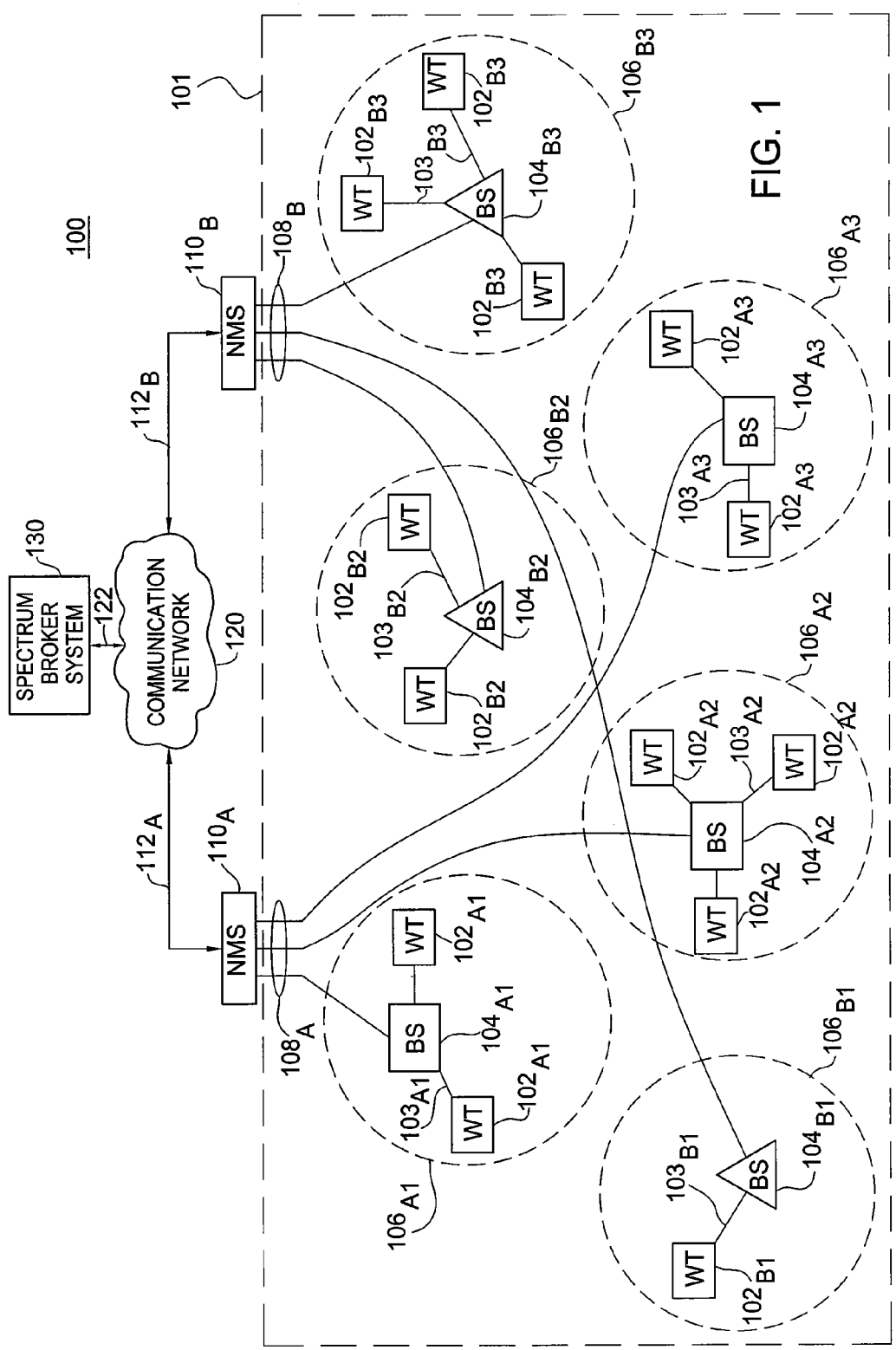
FIG. 1 depicts a high-level block diagram of a communication network.

The present invention provides spectrum management using dynamic spectrum allocation. The present invention implements a coordinated network in which allocation of spectrum within a region is dynamically controlled by a spectrum broker system utilizing regional spectrum demand aggregation and centralized spectrum management decisions. The present invention, utilizing dynamic wireless spectrum allocation methods, offers time-bounded access to a band of spectrum to various entities (e.g., to radio infrastructure providers (RIPs), network service providers (NSPs), and the like). In one embodiment, the present invention provides dynamic spectrum allocation in wireless networks employing Coordinated Dynamic Spectrum Access (C-DSA).

The present invention may utilize one of a plurality of demand processing models (e.g., batched, online, and the like) and one of a plurality of spectrum pricing models (e.g., merchant mode, simple bidding, iterative bidding, and the like) for providing spectrum management in various wireless network infrastructure configurations (e.g., shared base stations with collocated antennas, non-shared base stations with collocated antennas, non-shared base stations with non-collocated antennas, and the like). The present invention utilizes various spectrum management functions (e.g., scope, access fairness, stickiness, spectrum utilization, and the like, as well as various combinations thereof) for identifying and providing spectrum allocations.

In one embodiment, spectrum allocations may be determined by processing spectrum demands for satisfying spectrum allocation constraints. In one embodiment, spectrum allocation constraints may include demand model constraints determined using a spectrum demand model and conflict representation constraints. The spectrum demand model may include spectrum demand parameters (e.g., amount of spectrum requested, base stations requesting spectrum, and the like, as well as various combinations thereof) and spectrum demand constraints (e.g., scope constraints, timing constraints, and the like, as well as various combinations thereof). The conflict representation constraints may be determined using a representation of conflicts between base stations, which may include co-cell provider conflicts, co-located cross-provider conflict, remote cross-provider conflict, or a soft-handoff conflict.

Although primarily depicted and described herein as performing spectrum allocation within a single region, in one embodiment, the present invention may perform spectrum allocation across multiple regions. Although primarily depicted and described herein within the context of a macro-cellular network utilizing CDMA, spectrum allocation utilizing the present invention may be extended for use in cellular networks utilizing various other access technologies (e.g., TDMA, OFDM, and the like), as well as various other wireless networks (e.g., fixed wireless networks, mobile wireless networks, wireless mesh networks, and the like, as well as various combinations thereof).

FIG. 1 depicts a high-level block diagram of a communication network. Specifically, communication network 100 of FIG. 1 includes a region 101 including a first plurality of base stations (BSs) $104_{A1}$-$104_{A4}$ (collectively, BSs $104_A$) controlled by a first network management system (NMS) $110_A$ using a respective plurality of communication links (CLs) $108_{A1}$-$108_{A4}$ (collectively, CLs $108_A$), a second plurality of base stations (BSs) $104_{B1}$-$104_{B4}$ (collectively, BSs $104_B$) controlled by a second network management system (NMS) $110_B$ using a respective plurality of communication links (CLs) $108_{B1}$-$108_{B4}$ (collectively, CLs $108_B$). As depicted in FIG. 1, BSs $104_A$ and $104_B$ are collectively denoted as BSs 104 and NMSs $110_A$ and $110_B$ are collectively denoted as NMSs 110.

As depicted in FIG. 1, communication network 100 includes a spectrum broker system (SBS) 130 in communication with a communication network (CN) 120 using a communication link (CL) 122. As depicted in FIG. 1, CN 120 communicates with NMSs $110_A$ and $110_B$ using a respective plurality of communication links (CLs) $112_A$-$112_B$ (collectively, CLs 112). In one embodiment, SBS 130 may be owned by a spectrum service provider (SSP), such as a private-owned company, a government-owned company, a regulatory authority (e.g., FCC), and the like. Although not specifically depicted, CN 120 may include any communication network for supporting communications between SBS 130 and NSMs 110. For example, CN 120 may be a packet-based network (e.g., an Internet Protocol (IP) network).

As depicted in FIG. 1, NMSs $110_A$ and $110_B$ control BSs $104_A$ and $104_B$, respectively. As depicted in FIG. 1, BSs 104 communicate with respective pluralities of wireless terminals. Specifically, BSs $104_{A1}$-$104_{A4}$ communicate with respective pluralities of wireless terminals (WTs) $102_{A1}$-$102_{A4}$ (collectively, WTs $102_A$) using respective pluralities of wireless communication links (WCLs) $103_{A1}$-$103_{A4}$ (collectively, WTs $103_A$), and BSs $104_{B1}$-$104_{B4}$ communicate with respective pluralities of wireless terminals (WTs) $102_{B1}$-$102_{B4}$ (collectively, WTs $102_B$) using respective pluralities of wireless communication links (WCLs) $103_{B1}$-$103_{B4}$ (collectively, WTs 103B). The WTs $102_A$ and $102_B$ are collectively denoted as WTs 102. As depicted in FIG. 1, WTs 102 may include any devices operable for supporting wireless communications, including computers, phones, and the like.

As depicted in FIG. 1, wireless networks located within region 101 comprise cellular wireless networks. In one embodiment, wireless networks located within region 101 may be implemented using any cellular wireless technology, such as Code Division Multiple Access 2000 (CDMA2000) (e.g., 1xRTT, EV-DO, EV-DV, and the like), IMT-2000 (e.g., UMTS, GSM/GPRS/EDGE, and the like), WiMAX, TDMA, OFDM, and the like, as well as various combinations thereof. Although depicted and described herein with respect to cellular wireless networks, in one embodiment, the present invention may perform dynamic spectrum allocation in various other wireless networks such as fixed wireless networks, mesh wireless networks, and the like, as well as various combinations thereof.

In general, spectrum requirements vary across such technologies. For example, CDMA networks based on 1xRTT require 1.23 MHz of spectrum per carrier frequency, and within this class CDMA 3xRTT requires 3.75 MHz of spectrum per carrier frequency, while UMTS networks require 5 MHz of spectrum per carrier frequency. Furthermore, since different providers may deploy and operate such technologies differently, spectrum requirements may vary across providers within such technology classes. In one embodiment, since spectrum requirements vary across such technologies, as well as varying implementations of such technologies by different service providers, spectrum allocation may be performed in a manner for accounting for such spectrum requirement differences.

As depicted in FIG. 1, NMSs 110 operate as network management systems adapted for controlling various radio access network (e.g., BSs 104) functions. In one embodiment, NSMs 110 may control services provided over respective radio access networks. In one embodiment, NSMs 110 may control infrastructure of respective radio access networks. In one embodiment, at least a portion of NMSs 110 may include Radio Access Network Managers (RANMANs). In one embodiment, NMSs 110 may be located within network operations centers (not depicted) of respective service providers operating NMSs 110. As depicted in FIG. 1, NMSs $110_A$ and $110_B$ aggregate spectrum demands associated with BSs $104_A$ and $104_B$, respectively. The NMSs 110 provide the aggregated spectrum demands to SBS 130 for use in determining spectrum allocations.

In one embodiment, spectrum demands comprise actual spectrum demands. In one embodiment, actual spectrum demands aggregated by NMSs 110 include actual spectrum requests received from associated BSs 104. In one embodiment, actual spectrum requests received from BSs 104 include actual spectrum requests received by BSs 104 from associated WTs 102. In one such embodiment, WTs 102 may use bidirectional control channels for signaling bandwidth requirements to respective BSs 104. In one embodiment, respective control portions of BSs 104 may aggregate the actual spectrum requests received by BSs 104 from associated WTs 102 for transmission to associated NMSs 110. In one embodiment, instantaneous bandwidth demands from WTs 102 may be aggregated in order to determine respective total spectrum demands associated with BSs 104, respectively.

In one embodiment, aggregation of instantaneous bandwidth demands for determining a total spectrum demand may be performed by a spectrum estimator. In one embodiment, the spectrum estimator is operable for relating capacity requests to required spectrum amounts required for satisfying the capacity requests. In one embodiment, implementation of a spectrum estimator may be technology specific, requiring knowledge of modulation, scheduling, in-field measurements, and the like, as well as various combinations thereof. For example, assuming ten end users using wireless terminals in communication with a base station request 1 Mbps each, and a 1.25 MHz CDMA channel can support only two such end users, a spectrum estimator may determine that up to five CDMA channels must be configured at the base station for supporting the ten end users.

In one embodiment, spectrum demands comprise predicted spectrum demands. In one embodiment, predicted spectrum demands aggregated by NMSs 110 include predicted spectrum demands received from associated BSs 104. In one embodiment, respective control portions of BSs 104 may predict spectrum demands. In one such embodiment, respective control portions of BSs 104 may predict expected end user demands in order to determine predicted spectrum demands. In one embodiment, predicted spectrum demands aggregated by NMSs 110 include predicted spectrum demands determined by NMSs 110, respectively. In one embodiment, predicted spectrum demands may be estimated using historical spectrum demand information, historical spectrum utilization information, and the like, as well as various combinations thereof.

As depicted in FIG. 1, SBS 130 controls access to spectrum for a given geographical region R (illustratively, region 101). In one embodiment, region R under control of SBS 130 may include BSs 102 of a plurality of different service providers. For example, as depicted in FIG. 1, NMS $110_A$ and BSs $104_A$ belong to a first service provider and NMSs $110_B$ and BSs $104_B$ belong to a second service provider. In one embodiment, BSs 104 may be owned by network service providers (NSPs) providing services (e.g., voice, Internet access, telemetry, and the like, as well as various combinations thereof) to end users (illustratively, TDs 102). In this embodiment, NSPs perform radio infrastructure control functions typically provided by radio infrastructure providers (RIPs). In one embodiment, NMSs 110 and BSs 104 may be owned by respective RIPs. In this embodiment, NSPs may be customers of RIPs, utilizing radio infrastructure of the RIPs for providing various services.

In one embodiment, a region includes one RIP which owns the radio infrastructure in the region. In one embodiment, base stations deployed in the region may serve multiple homogenous NSPs (e.g., NSPs utilizing CDMA). In one embodiment, base stations deployed in the region may serve multiple heterogeneous NSPs (e.g., NSPs utilizing CDMA, TDMA, OFDM, and the like). In one embodiment, a physical base station may be modeled as a plurality of logical base stations. In one such embodiment, the physical base station may be modeled as a plurality of logical base stations such that a logical base station is assigned at various granularities (e.g., one logical base station for each NSP, one logical base station for each group of end users, one logical base station per end user, and the like, as well as various combinations thereof.

In the context of the SSP associated with SBS 130, a general advantage of this embodiment is that SBS 130 may maintain a single terrain propagation model for all RIPs supported by SBS 130. In the context of the NSPs supported by SBS 130, this embodiment has several advantages. The wireless endpoints of all NSPs are controlled using the same power control algorithm supported by the associated base station, thereby enabling sharing of a carrier frequency and CDMA codes among different NSPs within a cell. Furthermore, co-existence of multiple access technologies across the base station enables more efficient spectrum allocation and, therefore, more efficient spectrum utilization.

For example, assuming that there are ten wireless endpoints in the cell, of which six wireless endpoints require ~300 Kbps packet downloads and four wireless endpoints require standard voice traffic, the associated RIP can get 1.25 MHz spectrum and operate an EV-DO channel and a single 200 KHz GSM carrier for supporting the remaining voice customers in an 8-slot TDMA system. A homogenous single base station would have either reduced per-endpoint throughput by sharing 1.25 MHz among all endpoints or by allocating two 1.25 MHz channels. In other words, sharing of base stations among NSPs allows efficient use of spectrum across different NSP demands and end user demands.

In one embodiment, a region includes collocated antennas supporting multiple RIP base stations (i.e., although the antenna tower is shared, base stations of different RIPs operate independently). An example of this configuration is a town or city which requires all NSPs operating in the area to use a common tower for the associated antennas. In one such embodiment, within the context of CDMA networks, although a nearly identical radio environment is visible to all NSPs, due to the cross-provider conflict, only a subset of the user population is visible to the CDMA power control algorithms associated with the respective RIPs.

The cross provider conflict may be demonstrated using an example network having a first RIP with wireless endpoints located far from the base station and a second RIP with wireless endpoints located near the base station, the power control algorithm for the first RIP would require the associated wireless endpoints to transmit at high powers, interfering with transmissions from wireless terminals associated with the second RIP (and therefore transmitting at lower powers). From this example, the cross provider conflict requires that same carrier frequencies be assigned to base stations of two different NSPs if the base stations have overlapping regions of coverage. In this configuration, even if design changes can be made for assigning different pilot channels, synchronization channels, paging channels, and power channels to different RIPs in the same carrier channel, the cross provider conflict constraint must be strictly observed.

In one embodiment, a region includes non-collocated antennas and non-collocated base stations (i.e., the infrastructure of different providers is deployed independently). While the cross provider conflict applies to such regions, the cross provider conflict may be partially relaxed under certain circumstances. In one such embodiment, if base stations of different RIPs are sufficiently separated in radio distance (as predicted by terrain propagation models) interference induced by assigning the same carrier to different RIPs may be managed (e.g., by accounting for the interference as an added penalty). This embodiment allows more aggressive spectrum reuse across RIPs within the region. In one embodiment, such a region configured using non-collocated antennas and non-collocated base stations may require each RIP operating in the region to provide a separate terrain propagation map for base station placement.

Although primarily described herein with respect to macro-cellular networks, in one embodiment, the present invention may be used to allocate spectrum in regions including macro-cellular networks having embedded micro-cellular networks. For example, micro-cellular networks may include in-building networks, hotspot networks, and the like. In one such embodiment, in the context of CDMA networks, mobile nodes in the micro-cells are invisible to the macro-cell power control. If the power levels in the micro-cells are sufficiently low, and signal leak out of structures into the associated macro-cell is not significant, same carriers can be reused in the micro-cell. The nature of the network infrastructure for which spectrum is being allocated may be considered in developing spectrum management algorithms for SBS 130.

In one embodiment, SBS 130 controls access to a portion of available spectrum (i.e., portion of overall spectrum available for dynamic allocation). In one embodiment, the portion of the overall spectrum available for allocation by SBS 130 may be referred to as a Coordinated Access Band (CAB). In one embodiment, the owner of SBS 130 may own the CAB. In one embodiment, for example, portions of spectrum which may be included within CAB include Specialized Mobile Radio (SMR) (851-854/806-809 MHz, 861-866/816-821 MHz), public safety bands (764-776, 794-806 MHz), and unused broadcast UHF TV channels (450-470 MHz, 470-512 MHz (channels 14-20), 512-698 MHz (channels 21-51), 698-806 MHz (channels 52-69). Although specific portions of overall spectrum have been identified, the present invention may be utilized for allocating any portion of the overall spectrum.

As described herein, SBS 130 controls the CAB spectrum, granting time-bound portions of the spectrum to spectrum requesters (illustratively, NMSs 110). As described herein, spectrum allocations may specify spectrum allocation parameters such as extent of spatial region for spectrum, maximum transmission power, spectrum allocation exclusivity, and the like, as well as various combinations thereof. In one such embodiment, spectrum allocation may be represented as a spectrum lease. In this embodiment, compliant use of the allocated spectrum requires that the holder of the spectrum lease satisfy various spectrum lease conditions (i.e., spectrum utilization conditions) such as meeting power budget constraints, releasing the allocated spectrum upon termination of the spectrum lease, and the like, as well as various combinations thereof.

In one embodiment, spectrum allocation may be performed by freely sharing the entire CAB band. In one embodiment, spectrum allocation may be performed by splitting the CAB band into a plurality of CAB sub-bands. In one embodiment, one or more CAB sub-bands may be assigned to each network class (e.g., at least one CAB sub-band for CDMA networks, at least one CAB sub-band for each TDMA network, at least one CAB sub-band for each OFDM network, and the like). In one such embodiment, sub-band boundaries between each of the CAB sub-bands may vary in response to spectrum demand characteristics (i.e., CAB sub-band boundaries are not a priori fixed). In one embodiment, SBS 130 controls a contiguous band of B MHz spectrum that is divided into N contiguous channels having C MHz (such that N=B/C).

In one embodiment, SBS 130 determines spectrum allocations using aggregated demands from NMSs 110. In one embodiment, SBS 130 determines spectrum allocations using base station location information (i.e., using respective geographical locations of BSs 104). In one embodiment, SBS 130 determines spectrum allocations using propagation characterization information (i.e., signal propagation characteristics, radio interference environment characteristics, and the like, as well as various combinations thereof, associated with the region controlled by SBS 130). In one embodiment, SBS 130 determines spectrum allocations using a conflict graph which captures various constraints associated with spectrum allocation (e.g., co-cell separation, co-located cross-provider conflict, remote cross-provider conflict, and the like, as well as various combinations thereof). In one embodiment, the conflict graph formulation may be solved using one of a plurality of allocation formulations.

In one embodiment, SBS 130 determines spectrum allocations using base station information. In one embodiment, base station information associated with BSs 104 may be registered by respective NMSs 110 and provided to SBS 130. In one embodiment, base station information includes base station location information. In one such embodiment, base station location of base station $BS_i$ may be denoted as $BS(x_i, y_i)$. In one embodiment, base station information includes base station capability information. In one embodiment, base station capability information is maintained for each BS 104. In one embodiment, base station capability information includes the number of radio transmit-receiver (TRX) (radio interface) units (denoted as $K_i$), maximum power $P_{max}(i)$ per TRX, minimum frequency band and maximum frequency band per TRX, and the like, as well as various combinations thereof.

In one embodiment, SBS 130 determines spectrum allocations using terrain information. In one embodiment, terrain information includes geographical information associated with the region (e.g., locations, extent, and other parameters associated with mountains, valleys, and the like, as well as other geographical information). In one embodiment, terrain information may include signal propagation information. In one embodiment, signal propagation information may include signal propagation characterization information (i.e., information for characterizing the propagation of signals within the region, which may include geographical information, atmospheric information, and the like, as well as other information). In one embodiment, for example, terrain information may include geographical information associated with the geographical terrain of the region.

In one embodiment, signal propagation characterization information includes (or, alternatively, is used in conjunction with, applied as input to, and the like) at least one empirical radio propagation model for frequencies under consideration for spectrum allocation. In one embodiment, signal propagation characterization information may be adapted for use in estimating regions of interference, respective extents of interference in such identified regions of interference, and the like, as well as various combinations thereof. For example, for a given transmit power at a given base station location $BS(x_i, y_i)$ within region 101, SBS 130 estimates received power at all other base station locations within region 101. In one such embodiment, using such information, SBS 130 estimates regions of interference and associated extent of interference between at least a portion of the pairs of TRXs in region 101.

In one embodiment, signal propagation characterization information includes at least one of a static characterization of the radio interference environment or a dynamic characterization of the radio interference environment in the associated region for which SBS 130 operates as a spectrum allocation manager. In one embodiment, in which a dynamic characterization of the radio interference environment is performed, such characterizations may be performed using at least one of coordinated spectrum sensing (e.g., performed by associated WTs 102), radio interference sensing in the data path, and the like, as well as various combinations thereof. In one embodiment, SBS 130 may rely on dynamic characterization of radio interference environment for improved spectrum allocation, enforcement of spectrum allocation terms, and the like, as well as various combinations thereof.

In one embodiment, SBS 130 determines spectrum allocations using at least one spectrum pricing model (e.g., merchant mode, simple bidding, iterative bidding, and the like). In one embodiment, depending upon the spectrum pricing model utilized by SBS 130, SBS 130 may process spectrum demands for determining spectrum allocations (e.g., merchant mode) or spectrum offers (e.g., simple bidding or iterative bidding). In an embodiment, in which SBS 130 processes spectrum demands for determining spectrum offers, SBS 130 communicates spectrum offers to NSMs 110. In one such embodiment, NSMs 110 process the spectrum offers and provide spectrum offer responses to SBS 130. In this embodiment, SBS 130 processes the spectrum offer responses from NSMs 110 for determining spectrum allocations. As described herein, irrespective of the pricing model used by SBS 130, SBS 130 ultimately provides spectrum allocations to NSMs 110.

As described herein, in one embodiment, spectrum pricing for use in spectrum allocation may utilize one of a plurality of spectrum pricing modes including merchant mode, simple bidding, iterative bidding, and the like, as well as various combinations thereof. In a merchant mode spectrum pricing embodiment, spectrum price is determined by the network (e.g., by SBS 130) based upon current spectrum demand and spectrum utilization. In a merchant mode model, spectrum price is advertised on a "take it or leave it" basis and is allocated on a "first come first serve" basis. In other words, in a merchant mode model, no negotiation between SBS 130 and the provider is performed. The merchant mode model is generally appropriate when spectrum demand is less than available spectrum.

In a simple bidding spectrum pricing embodiment, an initial spectrum price is determined by the network (e.g., SBS 130) based upon current spectrum demand and spectrum utilization; however, as opposed to the merchant mode spectrum pricing embodiment, in the simple bidding spectrum pricing embodiment, the spectrum consumer (i.e., provider initiating the spectrum demand) may include within a spectrum demand a requested spectrum price that the spectrum consumer is willing to pay. In a simple bidding model, the network (e.g., SBS 130) collects all spectrum demands including the respective requested spectrum prices for all locations in the region. If available spectrum exceeds spectrum demand, each of the spectrum demands may be fulfilled. If spectrum demand exceeds available spectrum, since a portion of the spectrum demands cannot be fulfilled, machine-driven auctions may be conducted in order to decide the winning bidders to which the available spectrum is allocated. In one embodiment, a winning bid is binding for the originator of the spectrum demand. In one embodiment, a combinatorial auction may be used.

In an iterative bidding spectrum pricing embodiment, similar to a simple bidding spectrum pricing embodiment, an initial spectrum price is determined by the network (e.g., SBS 130). In the simple bidding spectrum pricing embodiment, however, cases may arise in which spectrum allocation fails for a winning spectrum bid. In such cases, iterative bidding spectrum pricing may be performed. In one embodiment, iterative bidding includes reiterating the simple bidding process to account for the identified conflict in spectrum allocation. In one embodiment, iterative bidding includes additional negotiation between network and spectrum consumer to allow the spectrum consumer to either accept a portion of the requested spectrum or release at least a portion of the spectrum demands initiated by the spectrum consumer. In such embodiments, an additional bidding iteration may be performed in which the network reconsiders spectrum demands (bids) that were rejected in earlier bidding rounds. In one embodiment, iterative bidding spectrum pricing may require an additional bidding protocol, as well as a bidding scheme with convergence guarantees and tight time constraints.

As depicted in FIG. 1, NMSs 110 receive spectrum allocations from SBS 130. In one embodiment, spectrum allocations identify transmission frequencies that may be utilized by respective BSs 104 associated with NSMs 110, as well as the time period over which the transmission frequencies may be utilized. In one further embodiment, spectrum allocations may identify transmission powers that may be utilized by respective BSs 104 associated with NSMs 110 (i.e., for controlling the respective sizes of WCAs 106 associated with BSs 104). By controlling transmission frequencies and powers of BSs 104, cross-provider conflict may be controlled. In one embodiment, NMSs 110 implement the spectrum allocations received from SBS 130 by signaling respective BSs 104 associated with NMSs 110.

Figure 2:
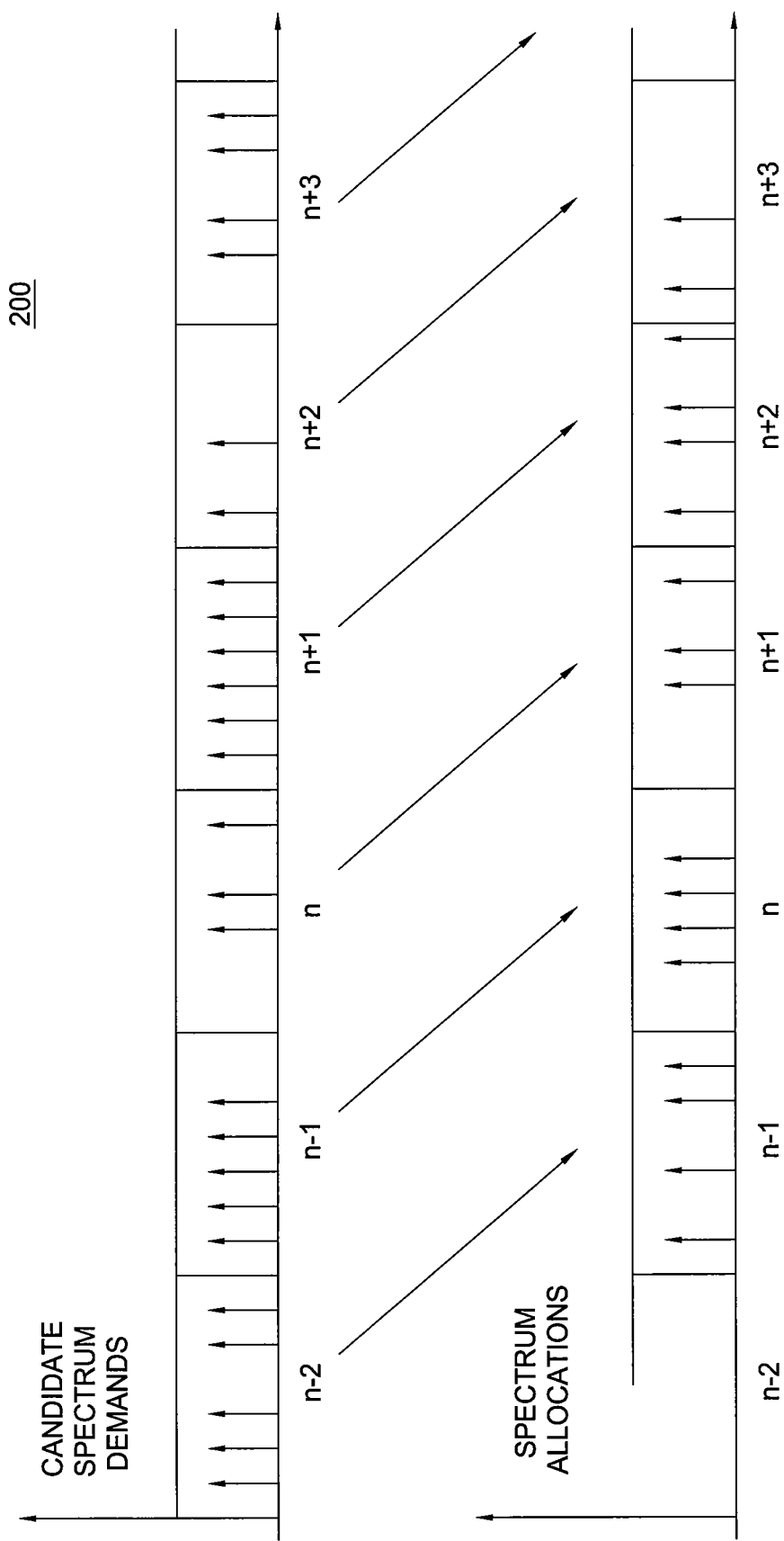
FIG. 2 depicts a plurality of time periods in which candidate spectrum demands are processed for determining spectrum allocations.

FIG. 2 depicts a plurality of time periods in which candidate spectrum demands are processed for determining spectrum allocations. As depicted in FIG. 2, candidate spectrum demands (i.e., spectrum demands considered for possible allocation) are determined for each of a plurality of fixed-length time periods (n−2) through (n+3). As depicted in FIG. 2, candidate spectrum demands determined in one time period are considered for allocation in an immediately subsequent time period. For example, as depicted in FIG. 2, candidate spectrum demands determined in time period (n−2) are processed for possible allocation in subsequent time period (n−1). For purposes of clarity, each candidate spectrum demand and spectrum allocation is represented using a vertical arrow.

Although depicted and described with respect to processing of candidate spectrum demands in one time period for allocation in a subsequent time period, various other spectrum demand processing models may be implemented. In one embodiment, candidate spectrum demands associated with one time period (e.g., time period (n−2)) are processed for allocation in a subsequent time period other than the immediately subsequent time period (e.g., n, (n+1), and other subsequent time periods). In one embodiment, candidate spectrum demands associated with a plurality of adjacent time periods (e.g., n and (n+1)) may be processed for allocation in a subsequent time period (e.g., (n+2), (n+3), and the like). In one embodiment, processing of candidate spectrum demands for allocation may be performed using a sliding window implementation.

In one embodiment, candidate spectrum demands may be determined by processing received spectrum demands. For example, SBS 130 may process spectrum demands received from NMSs 110 for determining candidate spectrum demands. In one embodiment, processing of candidate spectrum demands for determining spectrum allocations may be performed using base station information and signal propagation characterization information. In one embodiment, processing of candidate spectrum demands for determining spectrum allocations may be performed using infrastructure models, demand models, stickiness models, access fairness models, pricing models, conflict graphs, conflict graph processing algorithms, and the like, as well as various combinations thereof.

As described herein, in one embodiment, SBS 130 determines spectrum allocations by processing spectrum demands. In one embodiment, SBS 130 may perform online processing of spectrum demands (i.e., each spectrum demand is processed as it is received). In one such embodiment, if the received spectrum demand is admitted, the spectrum demand may be configured in the appropriate base station(s) independent of future spectrum demands. In one embodiment, SBS 130 may perform batched processing of spectrum demands. In one such embodiment, spectrum requests received within a window (e.g., window i of T units) may be combined and processed together. In this embodiment, spectrum demands that are admitted in the system and allocated are activated in a subsequent window (e.g., window (i+1)).

In general, batched processing of spectrum demands provides numerous advantages in spectrum allocation and management. In one embodiment, batched processing of spectrum demands guarantees a fixed, maximum latency for a spectrum demand. In one embodiment, batched processing of spectrum demands allows correlation and aggregation of temporally and spatially clustered spectrum demands to optimize spectrum allocation. In one embodiment, batched processing of spectrum demands enables allocation and de-allocation of spectrum at fixed intervals, thereby enabling network elements and wireless endpoints to predict transitions and allow higher level protocols to gracefully adapt to possible connectivity disruptions.

In one embodiment, allocation of spectrum in response to a spectrum demand depends on the scope of the spectrum demands (denoted as demand scope). A provider request for spectrum is typically for a particular base station location, however, depending on the multiple access technology used by the provider, interference considerations cause spectrum allocated in one cell to impact spectrum allocations in adjacent cells. In TDMA networks with conservative system configurations, in order to avoid interference, carrier frequencies allocated in a base station of one cell cannot be reused in adjacent cells. In CDMA networks, carrier frequencies allocated in a base station of one cell may be reused in adjacent cells, multi-path interference may be exploited constructively, and a soft handoff capability may be supported by tracking pilot signals from adjacent base stations.

In one embodiment, such spectrum demand considerations may be represented using a demand scope parameter. In one embodiment, the demand scope parameter may be represented using a two-tuple (denoted as (x,y), where x and y are parameter attributes). In one embodiment, demand scope (x,y) may represent a number of adjacent base stations taken into account during spectrum allocation. In CDMA networks, demand scope (x,y) defines a region over which the same frequency must be reused. In GSM networks, demand scope (x,y) defines a region over which the same frequency cannot be reused. Although described herein with respect to a two-tuple, a demand scope parameter may be implemented using fewer or more parameter attributes. Although described herein with respect to a single demand scope parameter, in one embodiment, a plurality of demand scope parameters may be used for characterizing demand scope.

In one embodiment, in a system utilizing batched processing of spectrum demands, a simple spectrum allocation model generates spectrum leases valid for a time duration of T units; however, small lease durations may result in frequent spectrum demands and, therefore, significant disruption in network services provided to wireless endpoints. In one embodiment, in order to prevent such disruptions, a provider may request spectrum for a duration that is multiples of T units (i.e., a larger the multiple produces longer spectrum availability and, therefore, better service continuity). In order to represent this concept, a number of consecutive time slots in which a provider may continue to use spectrum allocated in response to an accepted spectrum demand may be denoted as stickiness.

In a system utilizing stickiness, in a high spectrum demand situation, if spectrum is allocated for an extended period of time (i.e., allocated demand sticks in the system), spectrum capacity may be monopolized such that providers requesting spectrum may be denied an opportunity to access the requested spectrum. In one embodiment, spectrum allocation may be performed in a manner that ensures that no single provider obtains prolonged access to spectrum without paying a proportionately higher price for the prolonged spectrum access. In one such embodiment, this concept is denoted as access fairness. In an embodiment utilizing stickiness and access fairness to allocate spectrum, contention between stickiness and access fairness is moderated.

In one embodiment, in which stickiness is used to allocate spectrum, stickiness may be modeled as one of: deterministic sticky or probabilistic sticky. In a deterministic sticky model, a spectrum demand is guaranteed to be sticky for the requested number of timeslots N. The deterministic sticky model is a form of advanced reservation. In a probabilistic sticky model, continuation of a demand in a future time slot is probabilistic. In one embodiment, SBS 130 performs a coin toss algorithm to decide if the demand is reconsidered during selection of the spectrum allocations to be configured in the next timeslot. In one embodiment, the stickiness probability is determined as a function of the number of consecutive timeslots already used, the maximum number of timeslots requested, and the system utilization and service provider utilization in the previous (n−1) timeslots. In one such embodiment, the stickiness probability function may be implemented as (Eq. 1):

$$P(\text{demand sticks in slot } n) = \frac{[f(S_u, D_u(n-1, n-2, \ldots, 1)]}{(n-1)^\alpha N^\beta} \quad \text{Eq. 1}$$

In this embodiment, as spectrum demand is satisfied for an increasing number of consecutive timeslots, the probability of the spectrum demand continuing to being satisfied drops as a function of the maximum number of timeslots N and the number of timeslots allocated up to the current time. In this embodiment, if the spectrum demand has already been satisfied for (n−1) timeslots, during which the allocated spectrum has experienced significant utilization, it is desirable for SBS 130 to continue to satisfy the spectrum demand. This characteristic is implemented using the numerator of Eq. 1, which is an increasing function of system and demand specific utilization. In one embodiment, stickiness probability may alternatively be referred to as favorability rating.

In one embodiment, in which fairness is used to allocate spectrum, fairness may be modeled using one or more of a plurality of fairness criteria. In one embodiment, max-min fairness, which attempts to maximize the allocation of the spectrum demand receiving the poorest allocation, may be utilized. In one embodiment, weighted max-min fairness may be used to allocate spectrum. In one such embodiment, favorability ratings (e.g., stickiness probability as described herein) may be used as the weights in the weighted max-min fairness implementation.

In one embodiment, spectrum management requires tracking of the utilization of allocated spectrum. This is generally necessary to ensure that large providers do not use financial power to demand large portions of available spectrum in order to starve small providers from obtaining spectrum allocations. In one such embodiment, since it is critical that a provider demonstrate use of allocated spectrum, providers may be required to demonstrate that use of the allocated spectrum satisfies a threshold. In one embodiment, SSP may be required to monitor allocated spectrum utilization associated with spectrum allocated to providers. In one embodiment, providers allocated spectrum may be required to report allocated spectrum utilization to the SSP. In one such embodiment, providers must provide past allocated spectrum utilization information for use in allocation of spectrum in response to future demands (i.e., future spectrum demands).

In one embodiment, spectrum allocation is performed using spectrum demand modeled using one of a plurality of spectrum demand models. In one embodiment, each spectrum demand is modeled as an n-tuple including at least one of a plurality of parameters including: (1) base station location (e.g., the location of the base station at which the demand will be configured); (2) requested spectrum amount (e.g., the amount of required spectrum; (3) spectrum allocation duration (e.g., the length of time for which the spectrum is scheduled to be used, which may be referred to as sticky length); (4) provider identifier (e.g., an identifier associated with the provider making the spectrum demand); (5) price bid; (6) allocated spectrum utilization (e.g., a spectrum utilization history associated with the provider); and (7) demand scope (e.g., the spatial region over which the allocated spectrum is scheduled to be instantiated); and the like, as well as various combinations thereof.

In one embodiment, in which a spectrum demand model includes a requested spectrum amount parameter, the requested spectrum amount parameter may be specified as a range $[d_{min},d_{max}]$ such that at least $d_{min}$ amount of spectrum (e.g., $d_{min}$ channels) and at most $d_{max}$ amount of spectrum (e.g., $d_{max}$ channels) is allocated to a provider. In one embodiment, in which a spectrum demand model includes a requested spectrum amount parameter, the requested spectrum amount parameter may be specified as a minimum value $[d_{min}]$ (i.e., an "all-or-nothing" demand model in which a provider requests only $d_{min}$ amount of spectrum. Although primarily described herein with respect to a specific spectrum demand model including specific spectrum demand model parameters, various other spectrum demand models may be defined and utilized for allocating spectrum.

Figure 3:
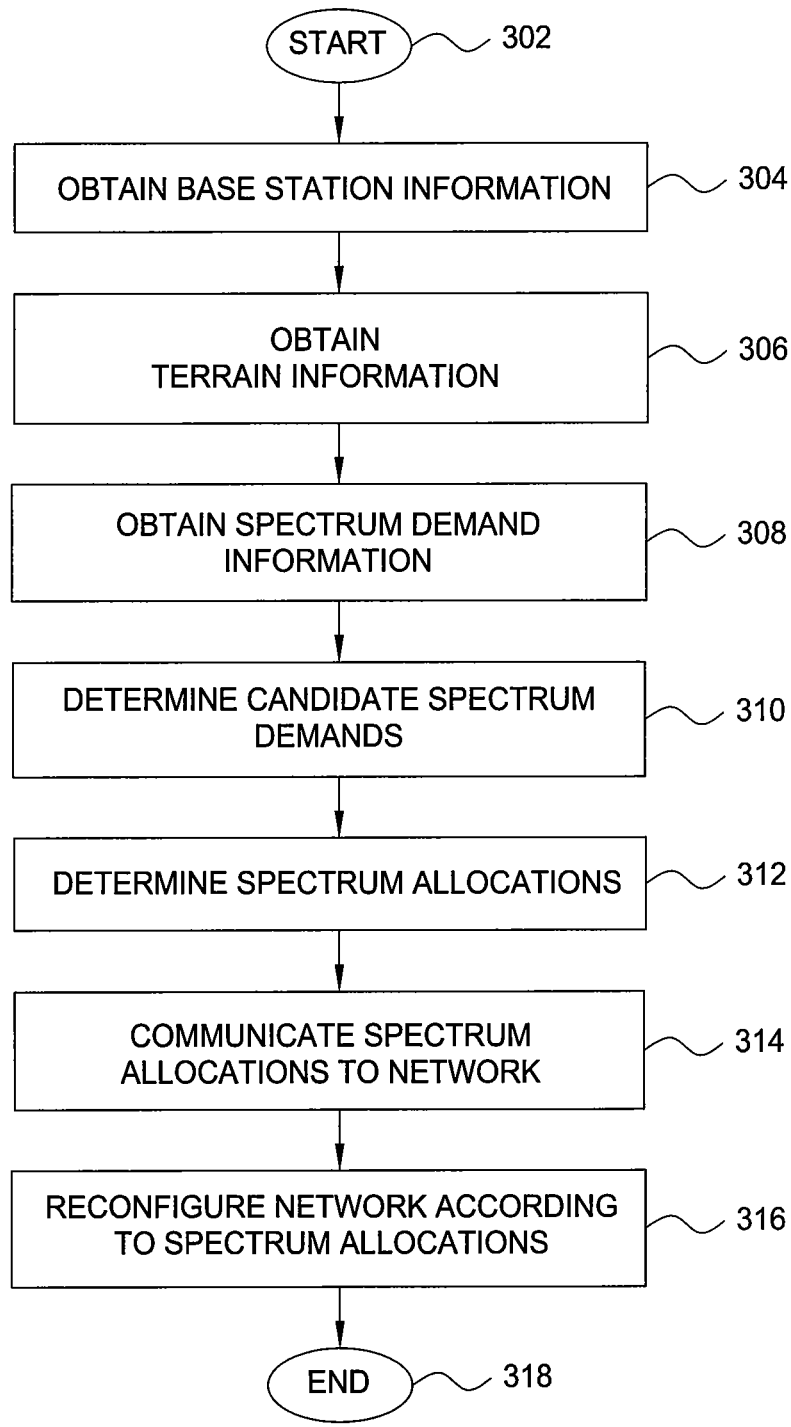
FIG. 3 depicts a method according to one embodiment of the present invention.

FIG. 3 depicts a method according to one embodiment of the present invention. Specifically, method 300 of FIG. 3 includes a method for allocating spectrum in response to spectrum demands. Although described with respect to processing and allocation of spectrum demands in adjacent time periods, respectively, method 300 may be repeated for each pair of adjacent time periods, as well as various other combinations of time periods. Although depicted as being performed serially, those skilled in the art will appreciate that at least a portion of the steps of method 300 may be performed contemporaneously, or in a different order than presented in FIG. 3. The method 300 begins at step 302 and proceeds to step 304.

At step 304, base station information is obtained. In one embodiment, base station information includes base station location information, characteristic information, and the like, as well as various combinations thereof. At step 306, terrain information is obtained. In one embodiment, terrain information includes signal propagation information. In one embodiment, signal propagation information includes information adapted for characterizing the propagation of signals within the region. In one embodiment, signal propagation characterization information includes radio propagation models, radio interference environment characterizations, and the like, as well as various combinations thereof. At step 308, spectrum demand information is obtained. At step 310, candidate spectrum demands are determined. In one embodiment, candidate spectrum demands may be determined using the method depicted and described with respect to FIG. 4.

At step 312, spectrum allocations are determined. In one embodiment, spectrum allocations may be determined by processing the base station location information, signal propagation characterization information, and candidate spectrum demands using various spectrum allocation algorithms. In one such embodiment, spectrum allocation algorithms may utilize various infrastructure models, demand models, stickiness models, access fairness models, pricing models, and the like, as well as various combinations thereof. At step 314, spectrum allocations are communicated to the network. In one embodiment, spectrum allocations include spectrum allocation information (e.g., allocated transmission frequencies, allocated transmission powers, spectrum allocation durations (e.g., one time period or multiple time periods), and the like) required for utilizing the respective spectrum allocations.

At step 316, the network is reconfigured according to the spectrum allocations. In one embodiment, the network is reconfigured according to the spectrum allocation information. For example, in one embodiment, network reconfiguration includes reconfiguring base stations to use transmission frequencies, transmission powers, and the like, over specific time intervals. In one embodiment, a network management system may provide spectrum allocation information to a controller portion of a base station. In this embodiment, the controller portion of the base station may signal transceiver portions of the base station for utilizing the spectrum allocations according to spectrum allocation information. For example, as depicted in FIG. 1, SBS 130 communicates spectrum allocations to NMSs 110 which reconfigure BSs 104 for utilizing the spectrum allocations. At step 318, method 300 ends.

Figure 4:
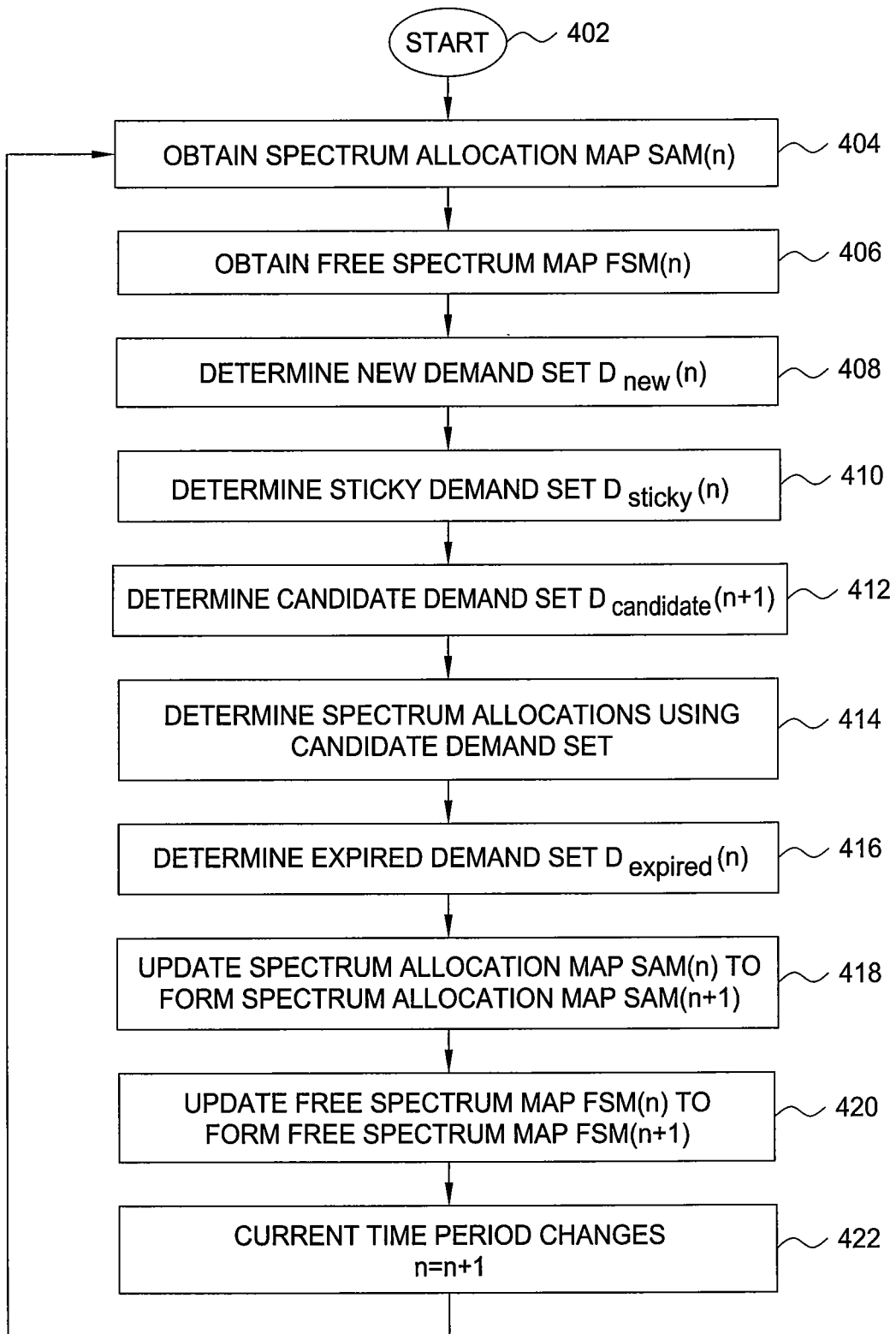
FIG. 4 depicts a method according to one embodiment of the present invention.

FIG. 4 depicts a method according to one embodiment of the present invention. Specifically, method 400 of FIG. 4 includes a method for determining candidate spectrum demands for use in determining spectrum allocations. Although depicted as being performed serially, those skilled in the art will appreciate that at least a portion of the steps of method 400 may be performed contemporaneously, or in a different order than presented in FIG. 4. The method 400 begins as step 402 (at which point the current time period is denoted as time period n) and proceeds to step 404.

At step 404, a spectrum allocation map (denoted as SAM (n)) is obtained for a current time period. In one embodiment, spectrum allocation map SAM(n) identifies portions of available spectrum allocated during current time period n. In one embodiment, spectrum allocation map SAM(n) includes spectrum allocations for each base station in the region, and may be denoted as SAM($x_i$,$y_i$,n) (where $x_i$,$y_i$ denotes base station location). At step 406, a free spectrum map (denoted as FSM(n)) is obtained for a current time period. In one embodiment, free spectrum map FSM(n) identifies portions of available spectrum unallocated during current time period n. In one embodiment, free spectrum map FSM(n) includes unallocated spectrum for each base station in the region, and may be denoted as FSM($x_i$,$y_i$,n) (where $x_i$,$y_i$ denotes base station location).

At step 408, a new demand set (denoted as $D_{new}$(n)) is determined. In one embodiment, new demand set $D_{new}$(n) is determined by aggregating spectrum demands received from the network (illustratively, from NMSs 110) during the current time period. In one embodiment, in which spectrum demands received during a current time period are processed during the current time period for determining spectrum allocations for an immediately following time period (i.e., next time period (n+1)), new demand set $D_{new}(n)$ includes spectrum demands received over only a portion of the current time period (denoted as n–Δ) where Δ denotes a portion of current time period n during which spectrum demand processing is performed for determining spectrum allocations for next time period (n+1).

At step 410, a stick demand set (denoted as $D_{sticky}(n)$) is determined. In one embodiment, sticky demand set $D_{sticky}(n)$ is determined by identifying current spectrum allocations (i.e., allocated in the current time period n) configured to continue into at least the next time period (i.e., which have been allocated for at least the next time period (n+1)). At step 412, a candidate demand set (denoted as $D_{cand}(n+1)$) is determined. The candidate demand set $D_{cand}(n+1)$ includes spectrum demands processed during current time period n for determining spectrum allocations in next time period (n+1). In one embodiment, candidate demand set $D_{cand}(n+1)$ is determined using new demand set $D_{new}(n)$ and sticky demand set $D_{sticky}(n)$). In one embodiment, candidate demand set $D_{cand}(n+1)$ is determined as a union of new demand set $D_{new}(n)$ and sticky demand set $D_{sticky}(n)$) (i.e., $D_{new}(n)$ U $D_{sticky}(n)$).

At step 414, spectrum allocations for next time period (n+1) are determined using candidate demand set $D_{candidate}(n+1)$ for next time period (n+1). In one embodiment, spectrum allocations may be determined by processing candidate demand set $D_{candidate}(n+1)$ using a spectrum allocation algorithm. In one embodiment, the spectrum allocation algorithm may include an algorithm for processing a conflict graph. In one such embodiment, the spectrum allocation algorithm may include one of a maximum service algorithm, a minimum penalty algorithm, and the like, as well as various combinations thereof. Although not depicted, spectrum allocations may be implemented within the network in the next time period, as depicted and described herein with respect to FIG. 2 and FIG. 3.

At step 416, an expired demand set (denoted as $D_{expired}(n)$) is determined. The expired demand set $D_{expired}(n)$ includes spectrum demands expiring at the end of current time period n. At step 418, spectrum allocation map SAM(n) utilized for processing spectrum demands in current time interval n is updated to form spectrum allocation map SAM(n+1) adapted for processing spectrum demands in next time interval (n+1). At step 420, spectrum allocation map SAM(n) and free spectrum map FSM(n) utilized for processing spectrum demands in current time interval n are updated to form spectrum allocation map SAM(n+1) and free spectrum map FSM(n+1), respectively, adapted for processing spectrum demands in next time interval (n+1). At step 422, current time period n becomes next time period (n+1) as denoted by n=n+1. From step 422, method 400 returns to step 404 where method 400 continues from time period to time period.

As described herein, in one embodiment, spectrum allocation within a region may be determined using a spectrum allocation algorithm. In one embodiment, the spectrum allocation algorithm may process spectrum demands using various infrastructure models, demand models, stickiness models, access fairness models, pricing models, and the like, as well as various combinations thereof. In one embodiment, spectrum allocation within a region may be performed subject to various constraints. In one such embodiment, in which spectrum allocation is performed within a region of a homogenous CDMA network, spectrum allocation (e.g., assignment of spectrum channels to TRXs associated with base stations within a region) may be performed subject to at least one of: (1) co-cell separation conflict constraints, (2) co-located cross-provider conflict constraints, (3) remote cross-provider conflict constraints, and (4) soft-handoff conflict constraints.

In one embodiment, the co-cell separation constraint requires that the same channel cannot be assigned to two different TRXs within a base station. In one embodiment, the co-located cross-provider conflict constraint requires that co-located base stations associated with different providers that share antenna infrastructure cannot be assigned the same carrier. In one embodiment, the remote cross-provider conflict constraint requires that the same channel cannot be assigned to different TRXs in remote base stations corresponding to different providers if the TRXs are within interference range of each other (however, this constraint may be violated if limited to be below a limit $I_{max}$). In one embodiment, the soft-handoff constraint requires that, given a base station of a provider, the same channel should preferably be assigned to all base stations within the scope of the given base station.

In one embodiment, in which spectrum allocation is performed within a region of a homogenous CDMA network in which CDMA is utilized by each provider for providing wireless service, constraints such as co-cell separation, co-located cross-provider conflict, remote cross-provider conflict, soft-handoff constraints, and the like, as well as various combinations thereof may be represented using a conflict graph. An exemplary region having base stations associated with multiple different providers, and an associated conflict graph generated for representing various constraints associated with the exemplary region, is depicted and described herein with respect to FIG. 5.

Figure 5:
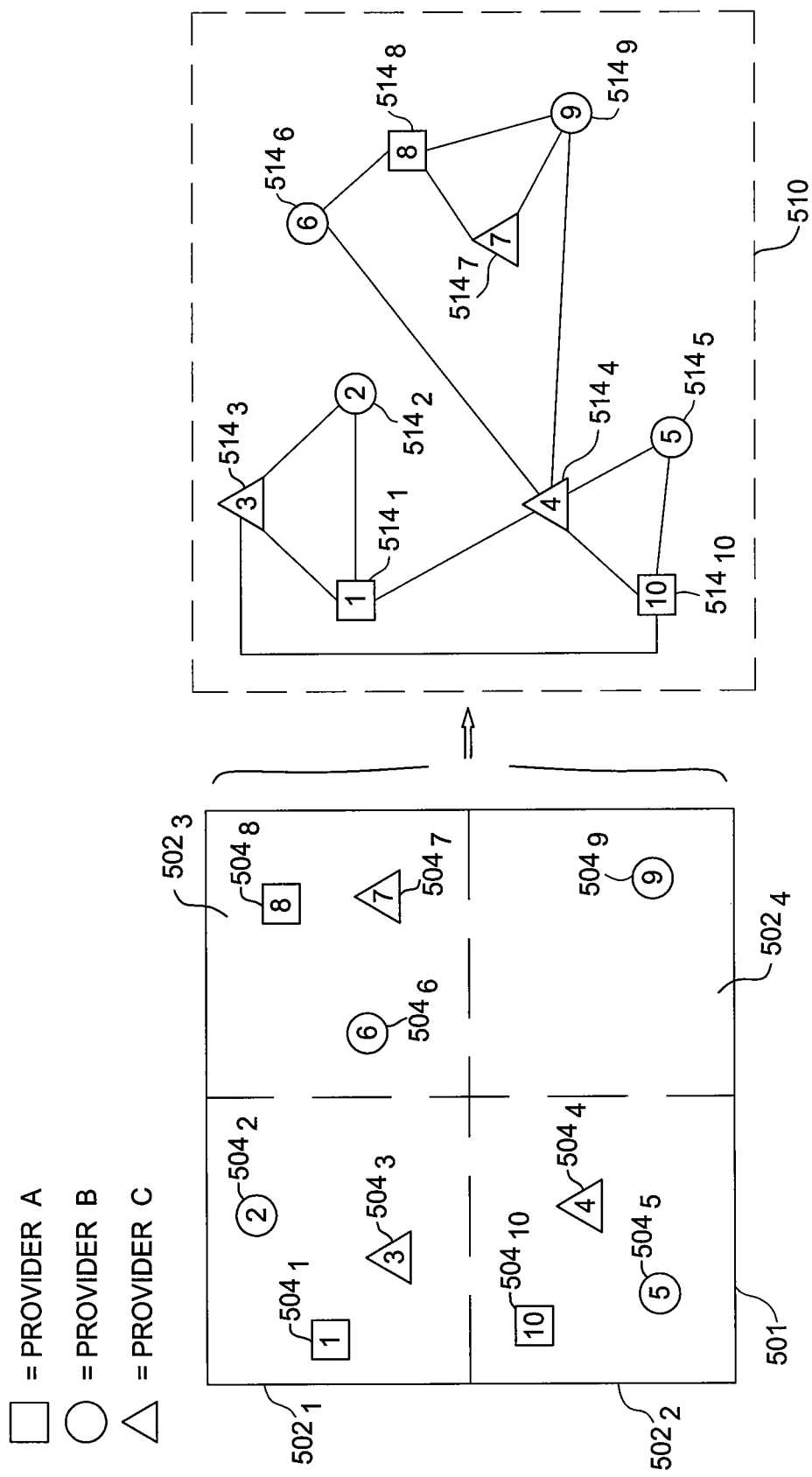
FIG. 5 depicts a high-level block diagram of a region including base stations associated with multiple providers and an associated conflict graph representative of various conflicts within the region.

FIG. 5 depicts a high-level block diagram of a region including base stations associated with multiple providers and an associated conflict graph representative of various conflicts within the region. Specifically, FIG. 5 includes a region 501 having a plurality of quadrants $502_1$-$502_4$ (collectively, quadrants 502). As depicted in FIG. 5, region 501 includes a plurality of base stations (BSs) $504_1$-$504_{10}$ (collectively, BSs 504). The BSs $504_1$, $504_2$, and $504_3$ are located within quadrant $502_1$, BSs $504_4$, $504_5$, and $504_{10}$ are located within quadrant $502_2$, BSs $504_6$, $504_7$, and $504_8$ are located within quadrant $502_3$, and BS $504_9$ is located within quadrant $502_4$. The BSs $504_1$, $504_8$, and $504_{10}$ belong to a first provider (provider A), BSs $504_2$, $504_5$, $504_6$, and $504_9$ belong to a second provider (provider B), and BSs $504_3$, $504_4$, and $504_7$ belong to a third provider (provider C).

As depicted in FIG. 5, region 501 may be processed for producing a conflict graph 510 representative of various potential conflicts between BSs 504. As depicted in FIG. 5, conflict graph 510 includes a plurality of base station representations (denoted as vertices) $514_1$-$514_{10}$ representative of BSs $504_1$-$504_{10}$, respectively. In one embodiment, pairs of vertices v, w belonging to different providers that cannot be assigned the same portion of spectrum (e.g., channel) may be considered to be coupled by a conflict edge (v,w) between the vertices. As depicted in FIG. 5, conflict graph 510 includes a plurality of conflict edges 512 between the following vertex pairs: (1,2), (1,3), (1,4), (2,3), (2,6), (3,10), (4,5), (4,6), (4,9), (4,10), (5,10), (6,8), (7,8), (7,9), and (8,9).

As depicted in FIG. 5, vertices corresponding to the same provider do not share conflict edges. As depicted in FIG. 5, since BSs $504_1$, $504_2$, and $504_3$ are located within quadrant $502_1$ (and may be determined to be within interference range of each other), and belong to different providers, vertices $514_1$, $514_2$, and $514_3$ share conflict edges. As depicted in FIG. 5, although BSs $504_1$ and $504_9$ belong to different providers, BSs $504_1$ and $504_9$ are located within different quadrants (and may be determined to be outside of the interference range of each other), and, as such, vertices $514_1$ and $514_9$ do not share conflict edges. In one embodiment, such determinations as to whether base stations are located within interference range of each other may be performed using a terrain propagation model for the portion of spectrum (e.g., frequency) under consideration.

Although not specifically described, conflict graph 510 includes other conflict edges representative of various constraints. In one embodiment, such constraints comprise hard constraints that cannot be violated during spectrum allocation. In continuation of the previous example, such constraints apply to edges (1,3), (7,8) and (5,10) and like edges which capture co-located cross-provider conflict. Although such constraints primarily apply to a configuration in which co-located base stations of different providers sharing antenna infrastructure, similar constraints may be identified for various other configurations (e.g., single provider per region, non-co-located base stations and non-co-located antennas, and the like, as well as various combinations thereof). For example, in non-co-located base station and non-co-located antenna configurations, such constraints may render spectrum allocation infeasible.

Although depicted and described herein (illustratively, with respect to FIG. 5) as a graphical representation, in one embodiment, a conflict graph representative of various conflicts may be represented mathematically without an associated graphical representation. In one embodiment, a conflict graph G may be defined in which each base station is represented by a single node or vertex v in the graph G=(V,E), |V|=n, |E|=m. In one embodiment, pairs of nodes v, w belonging to different providers that cannot be assigned the same channel may be considered to be coupled by an edge (v,w) between the nodes. In other words, conflict graph G represents configurations in which base stations of different providers are physically separated or co-located.

In continuation of the conflict graph representation, m(v) may denote the total number of channels assigned to the base station corresponding to node v, and f may denote an assigned channel. A variable $x_{vf}$ may be defined such that $x_{vf}=1$ if assigned channel f is within the set of available channels at node v (denoted as F(v)) (i.e., if f∈F(v)) and $x_{vf}=0$ otherwise (i.e., if f∉F(v)). In this representation, a summation of $x_{vf}$ values over all assigned channels f within the set of available channels at node v (i.e., over f∈F(v)) is equal to m(v) for all nodes v∈V. In this representation, if node v is assigned channel f and node w is assigned channel v, and an edge vw exists, the distance between nodes may be denoted in terms of the assigned channels as |f−g|. Using this notation, associated with every edge vw is a set $T_{vw}$ including all forbidden distances such that for all d∈$T_{vw}$={0, 1, ..., d(vw)−1}, |f−g|≥d.

In one embodiment, since hard constraints may render channel assignment infeasible, at least a portion of such hard constraints may be replaced with associated soft constraints which can be violated if required. In one such embodiment, for a pair of nodes v and w, a penalty function $p_{vw}(f,g)=F_v \times F_w \to \Re_+$ may be defined which captures interference levels when frequencies f and g are assigned to nodes v and w, respectively. In a CDMA network, $p_{vw}$ may be defined such that $p_{vw}(f,g)=c^{co}(vw,f)$ if f=g and $x_{vf}=1(f,g)$ otherwise (i.e., if f≠g). In one such embodiment, terrain propagation models may be used in predicting $p_{vw}(f)$. In one embodiment, such soft constraints represent the remote cross-provider conflict.

Although primarily described herein with respect to a specific conflict graph representation, various other conflict graphs may be defined for representing various combinations of constraints associated with spectrum allocation methodologies. For example, in one embodiment, an alternative representation of a conflict graph may be defined in which each TRX at a base station is represented by a single vertex (as opposed to representing a base station using a single vertex). In this embodiment, assuming base station $BS_i$ has $K_i$ TRX units, base station $BS_i$ is represented by $K_i$ nodes. In one such embodiment, since the co-cell separation constraint requires that a conflict graph include an edge between all $K_i$ interfaces, the conflict graph of this region may be quite large.

In one embodiment, a representation of various combinations of constraints (e.g., a conflict graph) may be processed for determining spectrum allocations within a region. In one embodiment, representations of various combinations of constraints may be processed using a feasibility DSA (F-DSA) formulation adapted for determining spectrum allocations. In one embodiment, representations of various combinations of constraints may be processed using a maximum service DSA (MAXSERV-DSA) formulation adapted for determining spectrum allocations. In one embodiment, representations of various combinations of constraints may be processed using a minimum penalty DSA (MINPEN-DSA) formulation adapted for determining spectrum allocations. Although specific formulations may be described herein, various other formulations may be used for determining dynamic spectrum allocations.

In one embodiment, a feasibility DSA (F-DSA) formulation may be used for determining spectrum allocation solutions. The F-DSA formulation satisfies specific constraints (as represented in Eqs. 2, 3, and 4 below). The first constraint (Eq. 2) requires that the total number of channels assigned to node v equal demand d requested by node v. The second constraint (Eq. 3) requires that if two nodes v and w are assigned frequencies f and g, respectively, the penalty must be less than the maximum tolerable threshold $p_{max}$, accounting for the soft cross-provider conflict constraint. In the third criteria (Eq. 4), which accounts for the hard cross-provider conflict constraint, $T_{vw}$ represents the set of blocked distance for edge e=(v,w). The set $T_{vw}$ may alternatively be computed using the requirement that $p_{vw}(f,g)$ not exceed $p_{max}$ for a given (f,g). The F-DSA formulation does not optimize any criteria, and may not account for scope constraint desirable in CDMA systems.

$$\sum_{f \in F(v)} x_{vf} = m(v) = \text{demand } d \quad \text{Eq. 2}$$
$$\forall v \in V$$

$$x_{vf} + x_{wg} \leq 1 \quad \text{Eq. 3}$$
$$\forall (v, w) \in E, f \in F(v), g \in F(w)$$
$$p_{vw}(f, g) \geq p_{\max}$$

$$x_{vf} + x_{wg} \leq 1 \quad \text{Eq. 4}$$
$$\forall (v, w) \in E, f \in F(v), g \in F(w)$$
$$|f - g| \in T_{vw}$$

In one embodiment, a maximum service DSA (MAXSERV-DSA) formulation which maximizes a number of assigned frequencies meeting required demands may be used for determining spectrum allocations. The MAXSERV-DSA formulation satisfies specific constraints (as represented in Eqs. 5, 6, 7 below). In a MAXSERV-DSA formulation, a binary variable $z_{vwf}$, which represents a configuration in which vertex v and a neighbor of vertex v are both assigned channel f, may be defined such that $z_{vwf}=1$ if $x_{vf}=x_{wf}=1$ and $z_{vwf}=0$ otherwise. In this formulation, a term α(v) may be defined (as shown in Eq. 5) as the sum of $z_{vwf}$ over scope(v), representing the level to which the soft-handoff constraint is satisfied over the scope. In one embodiment, for each vertex v, scope(v) is a-priori defined based on received spectrum demands.

$$\alpha(v) = \left( \sum_{w \in scope(v)} z_{vwf} \right) \leq |slope(v)| \qquad \text{Eq. 5}$$

In one embodiment of the MAXSERV-DSA formulation, n(v) may represent the number of channels assigned to vertex v in response to demand $[d_{min}, d_{max}]$. In this embodiment, a first objective is to meet demands of a maximum number of vertices (e.g., RIPs, BSs, TRXs, and the like, as well as various combinations thereof). In this embodiment, a second objective is to meet the soft handoff constraint of the maximum number of vertices. In one embodiment, the MAXSERV-DSA formulation may be characterized using various combinations of objective functions, constraints, criteria, and the like, as well as various combinations thereof. In one such embodiment, the objective functions, constraints, criteria, and the like may be defined as follows (as in Eq. 6 subject to conditions 6.1-6.6):

$$\max \sum_{v \in V} (w.n(v) + (1-w).\alpha(v)) \qquad \text{Eq. 6}$$

$$n(v) \leq d_{max}(v) \qquad \text{Con. 6.1}$$

$$d_{min} \leq n(v) \qquad \text{Con. 6.2}$$

$$n(v) = \sum_{f \in F(v)} x_{vf} \qquad \text{Con. 6.3}$$

$$x_{vf} + x_{wg} \leq 1 \qquad \text{Con. 6.4}$$
$$v, w \in V, f \in F(v), w \in F(w)$$
$$p_{vw}(f, g) \geq p_{max}$$

$$x_{vf} + x_{wf} \leq 1 + z_{vwf} \qquad \text{Con. 6.5}$$
$$\forall v, w \text{ s.t. } w \in scope(v)$$

$$z_{vwf} \leq x_{vf}, x_{wf} \qquad \text{Con. 6.6}$$
$$\forall v, w \text{ s.t. } w \in scope(v)$$

In this MAXSERV-DSA formulation, the objective function (Eq. 6) uses a weighting factor w to indicate relative importance of two criteria (i.e., n(v) and $\alpha(v)$). For example, for a weighting factor w=0.8, the importance of maximizing the number of channels assigned to each vertex v in response to an associated spectrum demand (n(v)) is 80% and the importance of maximizing the number of vertices for which soft-handoff constraint is satisfied ($\alpha(v)$) is 20%. The first constraint and second constraints (Con. 6.1, 6.2) represent the requirement that n(v) satisfy the demand criteria. The third and fourth constraints (Con. 6.3, 6.4) represent cross-provider constraint (similar to an F-DSA formulation). In one embodiment, the fourth constraint may be simplified by using a formulation ($T_{vw} = \{0\}$) accounting only for co-channel interference. The fifth and sixth constraints (Con. 6.5, 6.6) ensure that $z_{vwf}$ obtains correct values as specified in the first constraint.

In one embodiment, a minimum penalty DSA (MINPEN-DSA) formulation which minimizes total interference in a region may be used for determining spectrum allocation solutions. In one embodiment, an objective is to minimize the sum of penalties $p_{vwfg}$ incurred by all channel assignments associated with each pair of vertices v and w having associated frequencies f and g, respectively. In one such embodiment, two types of interference may be considered: (1) interference resulting from a channel being assigned to a base station for a single provider and (2) interference resulting from a channel being assigned to base stations of different providers with a certain penalty. The total co-channel interference in the region resulting from a channel being assigned to base stations of different providers with a certain penalty may be represented as in Eq. 7. The most general penalty constraint may be characterized as in Eq. 8. The total co-channel interference resulting from a channel being assigned to a base station for a single provider may be represented as in FIG. 9.

$$\sum_{(v,w) \in E} \sum_{f \in F(v), f \in F(w)} p_{vwfg} x_{vf} x_{wf} \qquad \text{Eq. 7}$$

$$\sum_{(v,w) \in E} \sum_{f \in F(v), g \in F(w), |f-g| \in T_{vw}} p_{vwfg} x_{vf} x_{wg} \qquad \text{Eq. 8}$$

$$\sum_{v \in V} \sum_{w \in scope(v)} p_{vwf} x_{vf} x_{wf} \qquad \text{Eq. 9}$$

In one embodiment, total co-channel interference resulting from a channel being assigned to a base station for a single provider may be handled by power control mechanisms. In one such embodiment, explicit reduction of co-channel interference may not be necessary. In one embodiment, an objective is to minimize a difference between total co-channel interference in the region resulting from a channel being assigned to base stations of different providers with a certain penalty (Eq. 7) and total co-channel interference resulting from a channel being assigned to a base station for a single provider (Eq. 8). In one such embodiment, since terms $x_{vf} x_{wf}$ are quadratic, a variable $y_{vwf}$ may be defined such that $y_{vwf} = 1$ if $x_{vf} = x_{wf} = 1$ and $y_{vwf} = 0$ otherwise. Using this variable, a function for minimizing the difference may be defined as follows (Eq. 10 subject to conditions 10.1-10.3):

$$\min \left( \left( \sum_{(v,w) \in E} \sum_{f \in F(v), g \in F(w), |f-g| \in T_{vw}} p_{vwfg} z_{vwfg} \right) - \left( \sum_{v \in V} \sum_{w \in scope(v)} p_{vwf} y_{vwf} \right) \right) \qquad \text{Eq. 10}$$

$$\sum_{f \in F(v)} x_{vf} = d(v) \qquad \text{Con. 10.1}$$
$$\forall v \in V$$

$$x_{vf} + x_{wf} \leq 1 + y_{vwf} \text{ for } v \in V, \qquad \text{Con. 10.2}$$
$$w \in scope(v),$$
$$f \in F(v), F(w)$$

$$x_{vf} + x_{wg} \leq 1 + z_{vwfg} \text{ for } (v, w) \in E, \qquad \text{Con. 10.3}$$
$$f \in F(v),$$
$$g \in F(w), |f - g| \in T_{vw}$$

In this MINPEN-DSA formulation, an objective is to minimize a difference between total co-channel interference in the region resulting from a channel being assigned to base stations of different providers with a certain penalty (Eq. 7) and total co-channel interference resulting from a channel being assigned to a base station for a single provider (Eq. 9). This MINP-DSA formulation is subject to specific conditions representative of various constraints associated with spectrum allocation (denoted as spectrum allocation constraints). The first condition (Con. 10.1) indicates that per-vertex demand is specified as a single spectrum demand quantity instead of a range of spectrum demand quantities. The second condition (Con. 10.2) represents the scope constraint. The third condition (Con. 10.3) represents penalties associated with forbidden distances and co-channel allocations.

Figure 6:
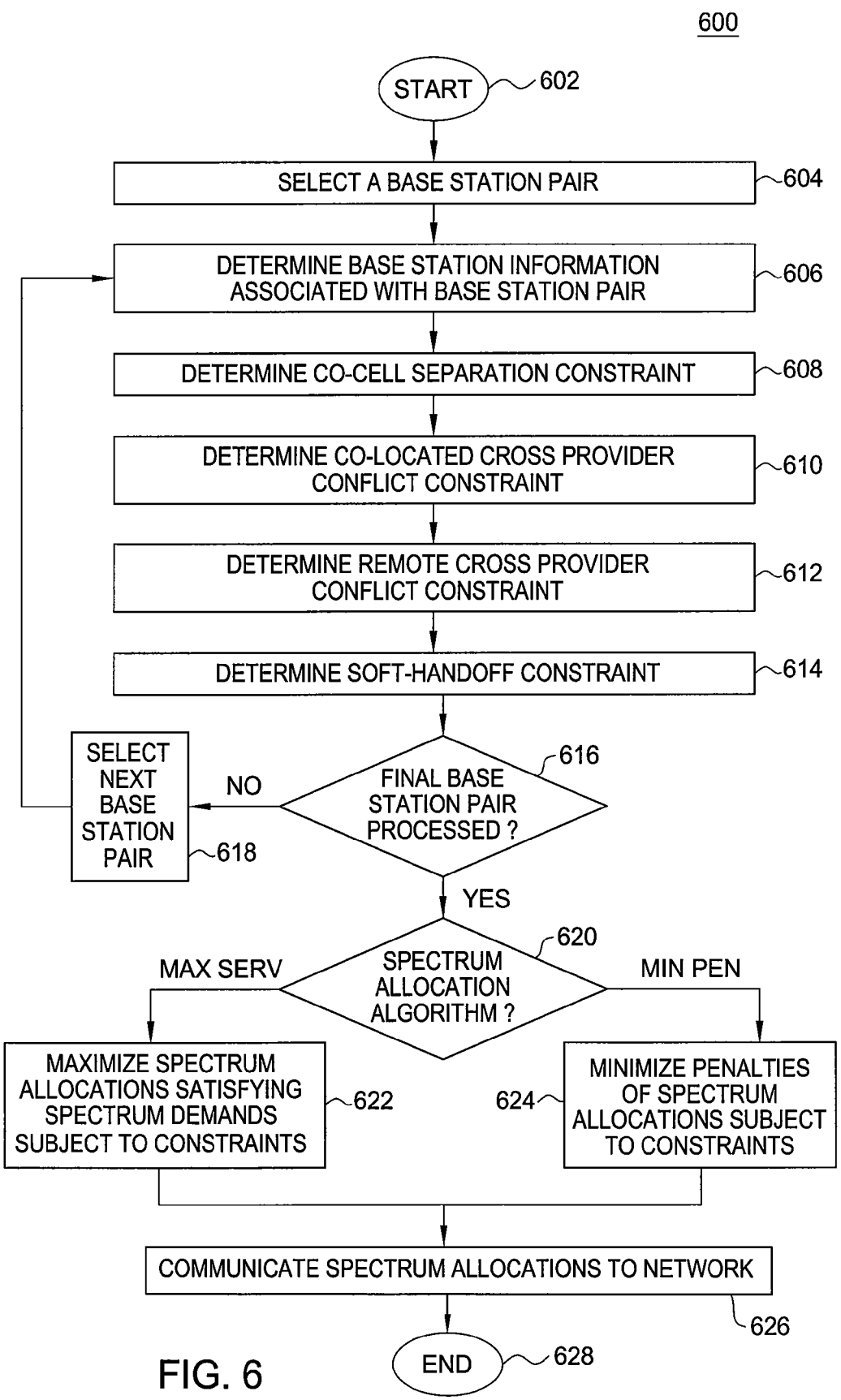
FIG. 6 depicts a method according to one embodiment of the present invention.

FIG. 6 depicts a method according to one embodiment of the present invention. Specifically, method 600 of FIG. 6 includes a method for determining spectrum allocations by processing a conflict graph using a spectrum allocation algorithm. As depicted in FIG. 6, one of a plurality of spectrum allocation algorithms (e.g., MAXSERV, MINPEN, and the like) may be used for processing a spectrum demands using a conflict graph. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, a base station pair is selected. In one embodiment, the base station pair is selected using a conflict graph. At step 606, base station information associated with the base station pair is determined. In one embodiment, base station information includes base station location information, base station characteristic information, and the like, as well as various combinations thereof. At step 608, a co-cell separation constraint is determined for the base station pair. At step 610, a co-located cross-provider conflict constraint is determined for the base station pair. At step 612, a remote cross-provider conflict constraint is determined for the base station pair. At step 614, a soft-handoff constraint is determined for the base station pair.

At step 616, a determination is made as to whether the final base station pair (e.g., from the conflict graph) has been processed. If the final base station pair has not been processed, method 600 proceeds to step 618. At step 618, a next base station pair is selected (e.g., from the conflict graph). From step 618, method 600 returns to step 606, at which point base station information associated with the selected base station pair is determined. If the final base station pair has been processed, method 600 proceeds to step 620. Although depicted and described as being processed on a base-station-pair-by-base-station-pair basis, a conflict graph may be processed using various processing approaches.

At step 620, a spectrum allocation algorithm is selected. If a spectrum allocation service maximization algorithm (denoted MAXSERV) is selected, method 600 proceeds to step 622. If a spectrum allocation penalty minimization algorithm (denoted MINPEN) is selected, method 600 proceeds to step 624. Although depicted and described as being selected dynamically, in one embodiment, in which only one spectrum allocation algorithm is utilized, step 620 may be omitted. In this embodiment, either step 622 is performed (step 624 is omitted) or step 624 is performed (step 622 is omitted).

At step 622, a spectrum allocation service maximization algorithm is applied for maximizing spectrum allocations satisfying spectrum demands subject to the various constraints determined from the conflict graph. At step 624, a spectrum allocation penalty minimization algorithm is applied for minimizing penalties of spectrum allocations subject to the various constraints determined from the conflict graph. From steps 622 and 624, method 600 proceeds to step 626. At step 626, spectrum allocations determined using the spectrum allocation algorithm are communicated to the network. At step 628, method 600 ends.

In one embodiment, spectrum allocations determined using one of the DSA formulations (e.g., F-DSA, MAX-SERV-DSA, MINPEN-DSA, and the like) may comprise potential spectrum allocation solutions. In one embodiment, an efficient exact solution or heuristic-based method may be used to determine the possible spectrum allocation solution. If $n(v)$ at all nodes satisfies $d_{min} \leq n(v) \leq d_{max}$, the possible spectrum allocation solution satisfies the demands of each of the RIPs. If $n(v)$ at all nodes does not satisfy $d_{min} \leq n(v) \leq d_{max}$, the largest demands $d_{max}$ for nodes with small favorability ratings may be set to $d_{min}+1$ values, respectively, and an attempt may be made to obtain a spectrum allocation in which $d_{min} \leq n(v)$ is satisfied for all nodes v. In other words, spectrum allocation of method 600 attempts to aggressively satisfy the minimum demands $d_{min}$ first, and then attempts to satisfy as much of the maximum demands $d_{max}$ as possible.

Although primarily described herein with respect to spectrum allocation within a region, in one embodiment, spectrum allocation may be coordinated across multiple regions. If non-overlapping portions of a dynamically sharable spectrum are used in adjacent regions, spectrum within each region can be management independently from spectrum in adjacent regions; however, if the same spectrum band is accessed in multiple regions, spectrum allocation within adjacent regions requires coordination of spectrum allocation between the adjacent regions. The regional approach to spectrum management, as depicted and described with respect to FIG. 1-FIG. 6, results in a configuration in which spectrum allocation within each region is performed independent of other regions. A cross-regional approach to spectrum management results in a configuration, as depicted and described with respect to FIG. 7, in which spectrum allocation is coordinated across regions.

Figure 7:
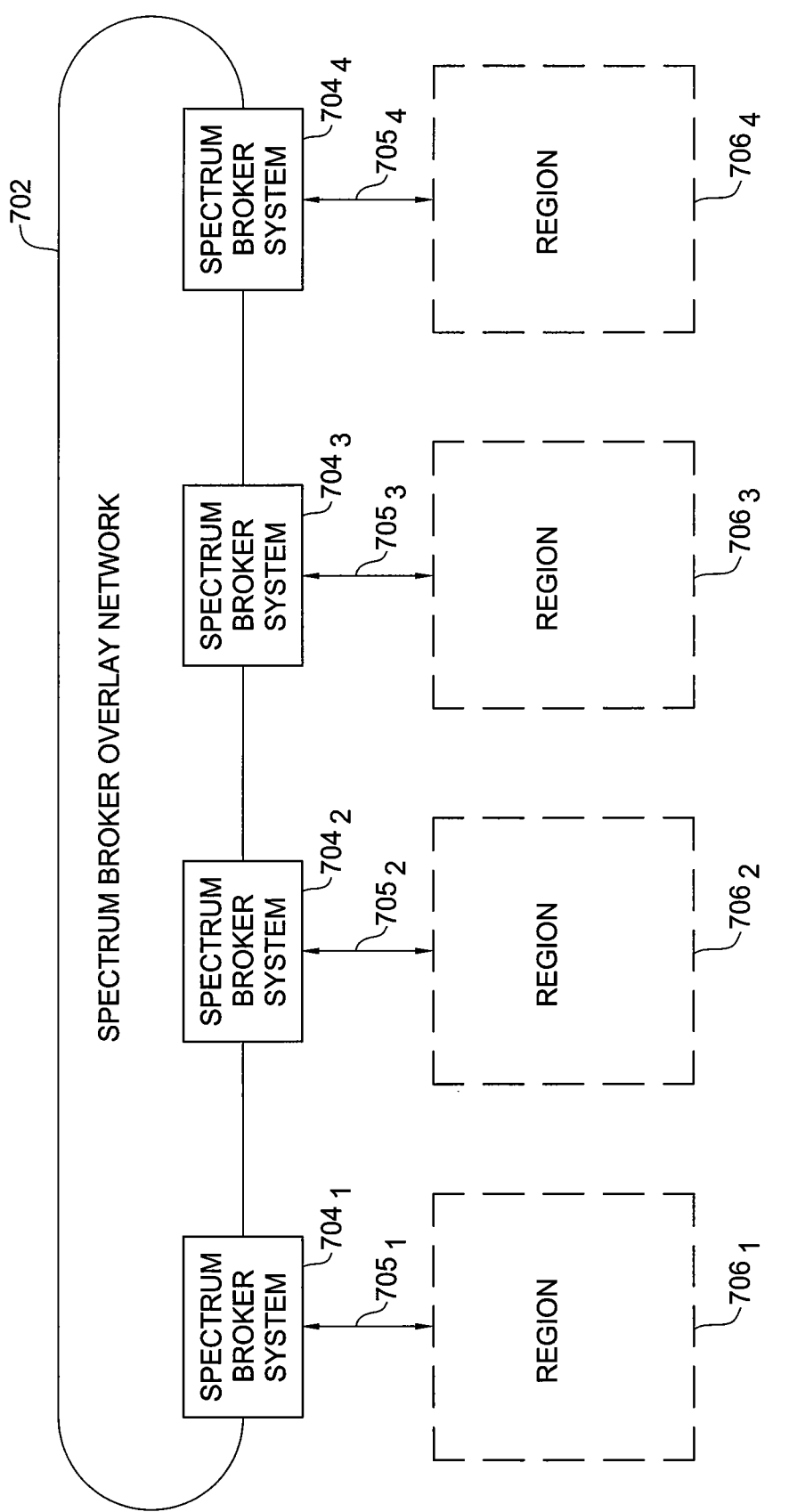
FIG. 7 depicts a high-level block diagram of a communication network including a plurality of regions managed by a respective plurality of networked spectrum broker systems.

FIG. 7 depicts a high-level block diagram of a communication network including a plurality of regions managed by a respective plurality of networked spectrum broker systems. Specifically, communication network 700 of FIG. 7 includes a spectrum broker overlay network (SBON) 702 supporting communications between a plurality of spectrum broker systems $704_1$-$704_4$ (collectively, SBSs 704). As depicted in FIG. 7, SBSs 704 manage spectrum allocation within a respective plurality of regions $706_1$-$706_4$ (collectively, regions 706). As depicted in FIG. 7, SBSs 704 communicate with regions $706_1$-$706_4$ using a respective plurality of communication links (CLs) $705_1$-$705_4$ (collectively, CLs 705). For purposes of clarity, BSs, NMSs, communication networks, and the like associated with regions 706 are not depicted.

As depicted in FIG. 7, possibility of spectrum conflict in the areas of region adjacency may be eliminated through communication between SBSs 704 using associated SBON 702. For example, consider an area of region adjacency between regions $706_1$ and $706_2$ (illustratively, the rightmost portion of region $706_1$ and leftmost portion of region $706_2$). In this example, without communication between SBSs $704_1$ and $704_2$, spectrum allocations provided to a base station located in the right-most portion of region $706_1$ may conflict with spectrum allocations provided to a base station located in the left-most portion of region $706_2$. As depicted in FIG. 7, communication between SBSs $704_1$ and $704_2$ using SBON 702 enables processing for preventing spectrum allocations resulting in spectrum conflicts between base stations located in the area of region adjacency between regions $706_1$ and $706_2$.

In one embodiment, the available spectrum band may be divided into a plurality of sub-bands, and sub-bands may be a-priori restricted as blocked frequencies in areas of region adjacency. In this embodiment, although a large portion of the available spectrum (e.g., $7/8^{th}$) is inaccessible in the adjacency regions, each spectrum broker system may a-priori determine and publish any unused sub-bands to peer spectrum broker systems of adjacent regions for use in adjacency regions. In a configuration having a simple grid subdivision of a large area, and a single spectrum broker system per region, a maximum of two sub-bands per square region may be used.

In one embodiment, the available spectrum band may be divided into a plurality of sub-bands, however, the sub-bands are not a-priori restricted as blocked frequencies in areas of region adjacency, rather, each spectrum broker system broadcasts actual spectrum allocations (i.e., a list of forbidden channels) to the spectrum broker systems of adjacent regions during each spectrum allocation cycle. The adjacent spectrum broker systems account for the actual spectrum allocations during spectrum allocation for the associated adjacent regions. This configuration requires time synchronization of the spectrum broker systems.

In one embodiment, since spectrum conflict is possible if base stations of two or more providers exist in the areas of region adjacency, a requirement may be established that only one provider provide coverage in the areas of region adjacency. In such a configuration, reallocation of the same frequency across the region boundaries results in soft-handoff, whereas allocating different frequencies results in hard-handoff. In either case, no spectrum is lost for dynamic access. In one embodiment, if multiple providers operate in areas of region adjacency, only one of the multiple providers is allowed to activate spectrum in the conflict region at a given time, thereby improving access efficiency for different providers.

Figure 8:
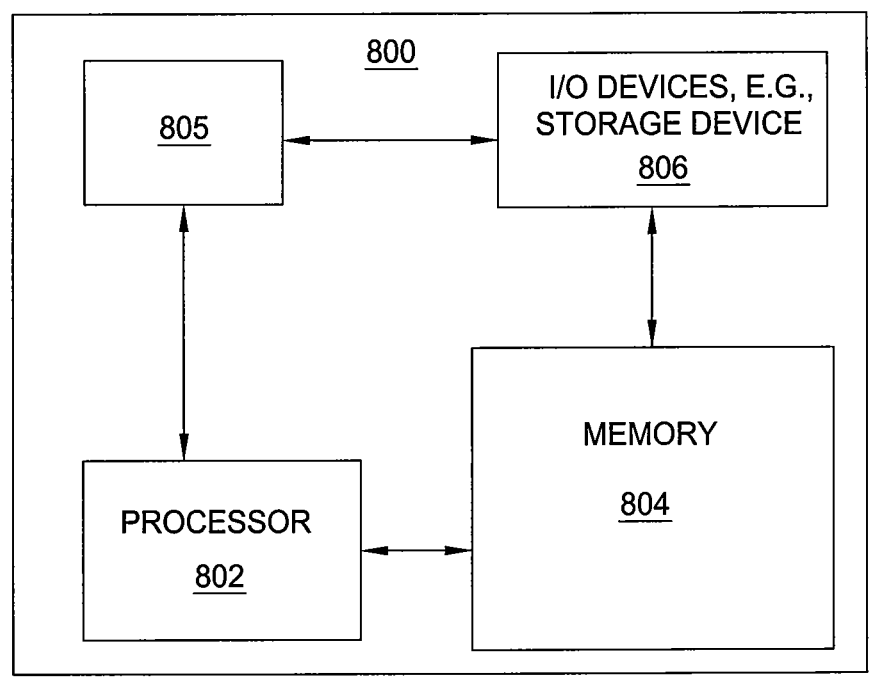
FIG. 8 depicts a high-level block diagram of a general-purpose computer suitable for use in performing the functions described herein.

FIG. 8 depicts a high-level block diagram of a general purpose computer suitable for use in performing the functions described herein. As depicted in FIG. 8, system 800 comprises a processor element 802 (e.g., a CPU), a memory 804, e.g., random access memory (RAM) and/or read only memory (ROM), a spectrum allocation module 805, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present spectrum allocation module or process 805 can be loaded into memory 804 and executed by processor 802 to implement the functions discussed herein. As such, spectrum allocation process 805 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. An apparatus configured for determining allocation of spectrum, the apparatus comprising:
   a processor and a memory communicatively connected to the processor, the processor configured to:
      receive a representation of a conflict graph, wherein the representation of the conflict graph comprises a first vertex representing a first base station of a first wireless service provider and
      a second vertex representing a second base station of a second wireless service provider, wherein the representation of the conflict graph further comprises an edge between the first vertex and the second vertex,
      wherein the edge is configured to represent at least one spectrum allocation constraint, wherein the at least one spectrum allocation constraint comprises at least one cross-provider conflict constraint; and
      determine, based on the representation of the conflict graph, a spectrum allocation for at least one of the first base station or the second base station.

2. The apparatus of claim 1, wherein the at least one cross-provider conflict constraint comprises a co-located cross-provider conflict constraint indicative that a common portion of the spectrum is not to be allocated to the first base station and the second base station.

3. The apparatus of claim 1, wherein the at least one cross-provider conflict constraint comprises a remote cross-provider conflict constraint indicative that a common portion of the spectrum is not to be allocated to the first base station and the second base station when the first base station and the second base station are within interference range of each other.

4. The apparatus of claim 1, wherein the representation of the conflict graph comprises a third vertex representing a third base station of the first wireless service provider, wherein the representation of the conflict graph further comprises a second edge between the first vertex and the third vertex, wherein the second edge is configured to represent a soft-handoff constraint.

5. The apparatus of claim 4, wherein the soft-handoff constraint is indicative that a common portion of the spectrum is to be assigned to the first base station and the third base station.

6. The apparatus of claim 1, wherein the processor is configured to generate the representation of the conflict graph.

7. The apparatus of claim 1, wherein the processor is configured to determine the spectrum allocation based on at least one of a feasibility dynamic spectrum access process, a maximum service dynamic spectrum access process, or a minimum penalty dynamic spectrum access process.

8. The apparatus of claim 1, wherein, to determine the spectrum allocation, the processor is configured to at least one of:
   determine the spectrum allocation in a manner for satisfying spectrum demands of a maximum number of base stations while satisfying soft-handoff constraints of a maximum number of base stations; or
   determine the spectrum allocation in a manner for minimizing a sum of penalties associated with spectrum allocation.

9. The apparatus of claim 1, wherein the processor is configured to:
   receive a first spectrum allocation request associated with the first base station and a second spectrum allocation request associated with the second base station; and
   determine the spectrum allocation based on the representation of the conflict graph, the first spectrum allocation request, and the second spectrum allocation request.

10. A method for determining allocation of spectrum, the method comprising:
   receiving a representation of a conflict graph via a processor, wherein the representation of the conflict graph comprises a first vertex representing a first base station of a first wireless service provider and
a second vertex representing a second base station of a second wireless service provider, wherein the representation of the conflict graph further comprises an edge between the first vertex and the second vertex, wherein the edge is configured to represent at least one spectrum allocation constraint, wherein the at least one spectrum allocation constraint comprises at least one cross-provider conflict; and
    determining, based on the representation of the conflict graph, a spectrum allocation for at least one of the first base station or the second base station.

11. An apparatus configured for determining allocation of spectrum, the apparatus comprising:
    a processor and a memory communicatively connected to the processor, the processor configured to determine a spectrum allocation based on a cross-provider conflict constraint associated with allocation of spectrum to a first base station of a first wireless service provider and a second base station of a second wireless service provider.

12. The apparatus of claim 11, wherein the cross-provider conflict constraint comprises a co-located cross-provider conflict constraint indicative that a common portion of the spectrum is not to be allocated to the first base station and the second base station.

13. The apparatus of claim 11, wherein the cross-provider conflict constraint comprises a remote cross-provider conflict constraint indicative that a common portion of the spectrum is not to be allocated to the first base station and the second base station when the first base station and the second base station are within interference range of each other.

14. The apparatus of claim 11, wherein, to determine the spectrum allocation based on the cross-provider conflict constraint, the processor is configured to:
    generate a representation of the cross-provider conflict constraint, wherein the representation of the cross-provider conflict constraint comprises a first vertex representing the first base station of the first wireless service provider and a second vertex representing the second base station of the second wireless service provider, wherein the representation of the cross-provider conflict constraint further comprises an edge between the first vertex and the second vertex, wherein the edge is configured to represent the cross-provider conflict constraint; and
    determine the spectrum allocation based on the representation of the cross-provider conflict constraint.

15. The apparatus of claim 11, wherein the processor is configured to:
    receive a first spectrum allocation request associated with the first base station and a second spectrum allocation request associated with the second base station; and
    determine the spectrum allocation based on the cross-provider conflict constraint, the first spectrum allocation request, and the second spectrum allocation request.

16. The apparatus of claim 11, wherein the processor is configured to determine the spectrum allocation based on a co-cell separation constraint indicative that a common portion of the spectrum is not to be assigned to two transmitters of the first base station.

17. The apparatus of claim 11, wherein the processor is configured to determine the spectrum allocation based on a soft-handoff constraint indicative that a common portion of the spectrum is to be assigned to the first base station and a third base station associated with the first wireless service provider when the first base station and the third base station are within neighbor scope of each other.

18. The apparatus of claim 11, wherein the processor is configured to determine the spectrum allocation based on at least one of a feasibility dynamic spectrum access process, a maximum service dynamic spectrum access process, or a minimum penalty dynamic spectrum access process.

19. The apparatus of claim 11, wherein the spectrum allocation comprises a first channel assignment for the first base station and a second channel assignment for the second base station.

20. A method for determining allocation of spectrum, the method comprising:
    using a processor and a memory for:
        determining a spectrum allocation based on a cross-provider conflict constraint associated with allocation of spectrum to a first base station of a first wireless service provider and a second base station of a second wireless service provider.

\* \* \* \* \*